US011487425B2

(12) United States Patent
Bagarolo et al.

(10) Patent No.: US 11,487,425 B2
(45) Date of Patent: Nov. 1, 2022

(54) SINGLE-HAND WIDE-SCREEN SMART DEVICE MANAGEMENT

(71) Applicant: International Business Machines Corporation, Armonk, NY (US)

(72) Inventors: Antonio Bagarolo, Marcianise (IT); Antonio Di Cocco, Rome (IT); Paolo Ottaviano, Rome (IT); Sandro Piccinini, Rome (IT); Andrea Tortosa, Rome (IT)

(73) Assignee: International Business Machines Corporation, Armonk, NY (US)

( * ) Notice: Subject to any disclaimer, the term of this patent is extended or adjusted under 35 U.S.C. 154(b) by 72 days.

(21) Appl. No.: 16/250,187

(22) Filed: Jan. 17, 2019

(65) Prior Publication Data
US 2020/0233577 A1    Jul. 23, 2020

(51) Int. Cl.
*G06F 3/04886* (2022.01)
*G06F 3/044* (2006.01)
(Continued)

(52) U.S. Cl.
CPC .......... *G06F 3/04886* (2013.01); *G06F 3/044* (2013.01); *G06F 3/0482* (2013.01); *G06F 3/03545* (2013.01); *G06F 2203/04108* (2013.01)

(58) Field of Classification Search
CPC .... G06F 3/04886; G06F 3/044; G06F 3/0482; G06F 3/03545; G06F 2203/04108
See application file for complete search history.

(56) References Cited
U.S. PATENT DOCUMENTS 5,808,914 A * 9/1998 Shin ................. G06F 40/177
                                            703/2
7,484,182 B1 * 1/2009 Smith ................. G06F 3/0481
                                            715/794
(Continued)

FOREIGN PATENT DOCUMENTS
CN    204131576 U    1/2015
CN    105323360 A    2/2016

OTHER PUBLICATIONS

Anonymously, "A system and method to touch full screen with single-hand operation in mobile device", IP.com Disclosure No. IPCOM000253187D, Publication Date: Mar. 13, 2018, 3 pages.
(Continued)

*Primary Examiner* — Jeremy L Stanley
(74) *Attorney, Agent, or Firm* — Stephen J. Walder, Jr.; Alexander Jochym

(57) ABSTRACT

Mechanisms are provided to implement a smart device screen management mechanism for facilitating single-hand wide-screen management of the smart device. The mechanism identifies a movement indicated by a user in proximity of a screen of the smart device and determines whether the movement indicates a selection of an action item outside a maximum reach of the user when the user is operating the smart device with a single hand. Responsive to the movement indicating a selection of an action item outside the maximum reach of the user, the mechanism identifies a direction of the movement indicated by the user in proximity of the screen of the smart device and identifies a subset action items that are in the direction of the movement and outside the maximum reach. The mechanism then presents the subset of action items in a redrawn user interface within the maximum reach of the user.

20 Claims, 8 Drawing Sheets

(51) Int. Cl.
*G06F 3/0482* (2013.01)
*G06F 3/0354* (2013.01)

(56) References Cited

U.S. PATENT DOCUMENTS

| | | | | |
|---|---|---|---|---|
| 8,847,995 B2* | 9/2014 | Kimura | H04M 1/0239 | |
| | | | 345/660 | |
| 9,047,008 B2* | 6/2015 | Li | G06F 3/04883 | |
| 9,268,407 B1* | 2/2016 | Noble | H04N 5/247 | |
| 9,552,154 B2* | 1/2017 | Park | G06F 3/04886 | |
| 9,626,104 B2 | 4/2017 | Kulas | | |
| 9,742,902 B2* | 8/2017 | Shimuta | A61B 5/6898 | |
| 10,079,972 B2* | 9/2018 | Liao | G06F 3/04817 | |
| 10,372,320 B2* | 8/2019 | Dong | G06F 3/04883 | |
| 10,452,232 B2* | 10/2019 | Sagong | G06F 3/04883 | |
| 2004/0165784 A1* | 8/2004 | Xie | G06T 7/00 | |
| | | | 382/254 | |
| 2005/0184991 A1* | 8/2005 | Stamm | G06T 11/203 | |
| | | | 345/467 | |
| 2009/0109187 A1* | 4/2009 | Noma | G06F 3/04883 | |
| | | | 345/173 | |
| 2009/0295743 A1* | 12/2009 | Nakajoh | G06F 3/04883 | |
| | | | 345/173 | |
| 2010/0013780 A1* | 1/2010 | Ikeda | G06F 3/04883 | |
| | | | 345/173 | |
| 2010/0085317 A1* | 4/2010 | Park | G06F 3/04817 | |
| | | | 345/173 | |
| 2010/0127994 A1* | 5/2010 | Aono | G06F 3/04886 | |
| | | | 345/173 | |
| 2011/0285665 A1* | 11/2011 | Matsumoto | G06F 3/044 | |
| | | | 345/174 | |
| 2012/0030624 A1* | 2/2012 | Migos | G06F 3/0482 | |
| | | | 715/830 | |
| 2012/0032979 A1* | 2/2012 | Blow | G06F 3/04817 | |
| | | | 345/647 | |
| 2012/0271545 A1* | 10/2012 | Cheng | G06F 3/0488 | |
| | | | 701/431 | |
| 2013/0009903 A1* | 1/2013 | Shiota | G06F 3/0486 | |
| | | | 345/173 | |
| 2013/0222304 A1* | 8/2013 | Taguchi | G06F 3/0418 | |
| | | | 345/173 | |
| 2013/0265235 A1* | 10/2013 | Cai | G06F 3/0488 | |
| | | | 345/169 | |
| 2013/0268900 A1* | 10/2013 | Ferren | G06F 3/0488 | |
| | | | 715/863 | |
| 2013/0307783 A1* | 11/2013 | Park | G06F 3/04886 | |
| | | | 345/169 | |
| 2013/0307797 A1* | 11/2013 | Taguchi | G06F 3/013 | |
| | | | 345/173 | |
| 2013/0307801 A1* | 11/2013 | Nam | H04M 1/72563 | |
| | | | 345/173 | |
| 2013/0318147 A1* | 11/2013 | Dufrene | G06F 9/45533 | |
| | | | 709/201 | |
| 2014/0015778 A1* | 1/2014 | Taguchi | G06F 3/0488 | |
| | | | 345/173 | |
| 2014/0028602 A1* | 1/2014 | Morinaga | G06F 3/04886 | |
| | | | 345/173 | |
| 2014/0055371 A1* | 2/2014 | Li | G06F 3/04883 | |
| | | | 345/173 | |
| 2014/0055384 A1* | 2/2014 | Cheng | G06F 3/04886 | |
| | | | 345/173 | |
| 2014/0082546 A1* | 3/2014 | Yang | G06F 3/0216 | |
| | | | 715/773 | |
| 2014/0184503 A1* | 7/2014 | Jang | G06F 3/04817 | |
| | | | 345/158 | |
| 2014/0204063 A1* | 7/2014 | Kaida | G06F 1/169 | |
| | | | 345/184 | |
| 2014/0380209 A1* | 12/2014 | Tsukamoto | G06F 3/0488 | |
| | | | 715/763 | |
| 2015/0135132 A1* | 5/2015 | Josephson | G06F 3/04842 | |
| | | | 715/784 | |
| 2015/0145772 A1* | 5/2015 | Chien | G06F 3/03547 | |
| | | | 345/158 | |
| 2015/0153951 A1* | 6/2015 | Kim | G06F 3/0488 | |
| | | | 715/773 | |
| 2015/0177826 A1* | 6/2015 | Aizawa | G06F 3/0488 | |
| | | | 345/173 | |
| 2015/0234581 A1* | 8/2015 | Terrero | G06F 3/04886 | |
| | | | 715/863 | |
| 2015/0242117 A1* | 8/2015 | Nakashima | G06F 3/04842 | |
| | | | 715/773 | |
| 2015/0355735 A1* | 12/2015 | Matsuda | G06F 3/0488 | |
| | | | 345/162 | |
| 2015/0355805 A1* | 12/2015 | Chandler | G06F 3/04842 | |
| | | | 715/784 | |
| 2016/0041674 A1* | 2/2016 | Xia | G06F 3/0488 | |
| | | | 345/173 | |
| 2016/0070412 A1* | 3/2016 | Shimazu | G06F 3/0488 | |
| | | | 345/173 | |
| 2016/0070466 A1 | 3/2016 | Chaudhri et al. | | |
| 2016/0291744 A1* | 10/2016 | Shikama | G06F 3/0416 | |
| 2016/0306543 A1* | 10/2016 | Bang | G06F 3/04883 | |
| 2016/0350503 A1* | 12/2016 | Jun | A61B 8/54 | |
| 2017/0010806 A1* | 1/2017 | Pingco | G06F 3/04883 | |
| 2017/0031463 A1 | 2/2017 | Charbiwala et al. | | |
| 2017/0075453 A1* | 3/2017 | Nakaizumi | G06F 3/0418 | |
| 2017/0090714 A1* | 3/2017 | Lee | G06F 3/0488 | |
| 2017/0255323 A1* | 9/2017 | Funaoka | G06F 3/0416 | |
| 2017/0277266 A1* | 9/2017 | Hwang | G06F 3/0481 | |
| 2017/0277396 A1* | 9/2017 | Chung | G06F 9/451 | |
| 2017/0279951 A1* | 9/2017 | Hwang | G06F 3/04883 | |
| 2017/0300205 A1* | 10/2017 | Villa | G06F 3/0484 | |
| 2017/0329489 A1* | 11/2017 | Arakawa | G06T 3/40 | |
| 2018/0307401 A1* | 10/2018 | Carey | G06F 3/017 | |
| 2019/0244138 A1* | 8/2019 | Bhowmick | G06N 3/08 | |
| 2019/0287492 A1* | 9/2019 | Kanamaru | G09G 5/38 | |
| 2020/0027033 A1* | 1/2020 | Garg | H04L 67/34 | |
| 2020/0104705 A1* | 4/2020 | Bhowmick | G06N 3/04 | |
| 2021/0185162 A1* | 6/2021 | Takahashi | G06F 1/169 | |

OTHER PUBLICATIONS

Kathuria, Jaya et al., "Making smartphones smarter with capacitive touch sensing", EDN Network, Jan. 12, 2016, 6 pages.

Tsuji, Satoshi et al., "A Proximity Touch Screen Using Mutual Capacitance Measurement", Proceedings of the 2016 IEEE, International Conference on Robotics and Biomimetics, Qingdao, China, Dec. 3-7, 2016, 5 pages.

* cited by examiner

SINGLE-HAND WIDE-SCREEN SMART DEVICE MANAGEMENT

BACKGROUND

The present application relates generally to an improved data processing apparatus and method and more specifically to mechanisms for single-handed wide-screen smart device management.

A smart device is an electronic device, generally connected to other devices or networks via different wireless protocols such as Bluetooth, Near-field communication (NFC), Wi-Fi, 3G, 4G, 5G, etc., that can operate to some extent interactively and autonomously. Several notable types of smart devices are smartphones, smart thermostats, phablets and tablets, smartwatches, smart bands, smart key chains and smart speakers. The term can also refer to a device that exhibits some properties of ubiquitous computing, including—although not necessarily—artificial intelligence.

Smart devices can be designed to support a variety of form factors, a range of properties pertaining to ubiquitous computing and to be used in three main system environments: physical world, human-centered environments and distributed computing environments.

SUMMARY

This Summary is provided to introduce a selection of concepts in a simplified form that are further described herein in the Detailed Description. This Summary is not intended to identify key factors or essential features of the claimed subject matter, nor is it intended to be used to limit the scope of the claimed subject matter.

In one illustrative embodiment, a method is provided, in a data processing system comprising a processor and a memory, the memory comprising instructions that are executed by the processor to configure the processor to implement a smart device screen management mechanism for facilitating smart and effective single-hand wide-screen management of the smart device. The method comprises identifying, by the smart device screen management mechanism, a movement indicated by a user in proximity of a screen of the smart device. The method also comprises determining, by the smart device screen management mechanism, whether the movement indicates a selection, from a set of action items, of an action item outside a maximum reach of the user when the user is operating the smart device with a single hand. Responsive to the movement indicating a selection of an action item outside the maximum reach of the user, the method comprises identifying, by the smart device screen management mechanism, a direction of the movement indicated by the user in proximity of the screen of the smart device. Moreover, the method comprises identifying, by the smart device screen management mechanism, a subset action items that are in the direction of the movement indicated by the user and outside the maximum reach of the user. The method further comprises presenting, by the smart device screen management mechanism, the subset of action items in a redrawn user interface within the maximum reach suited to be reachable by the user when the user is operating the smart device with the single hand.

In other illustrative embodiments, a computer program product comprising a computer useable or readable medium having a computer readable program is provided. The computer readable program, when executed on a computing device, causes the computing device to perform various ones of, and combinations of, the operations outlined above with regard to the method illustrative embodiment.

In yet another illustrative embodiment, a system/apparatus is provided. The system/apparatus may comprise one or more processors and a memory coupled to the one or more processors. The memory may comprise instructions which, when executed by the one or more processors, cause the one or more processors to perform various ones of, and combinations of, the operations outlined above with regard to the method illustrative embodiment.

These and other features and advantages of the present invention will be described in, or will become apparent to those of ordinary skill in the art in view of, the following detailed description of the example embodiments of the present invention.

BRIEF DESCRIPTION OF THE DRAWINGS

The invention, as well as a preferred mode of use and further objectives and advantages thereof, will best be understood by reference to the following detailed description of illustrative embodiments when read in conjunction with the accompanying drawings, wherein.

DETAILED DESCRIPTION

Figure 1:
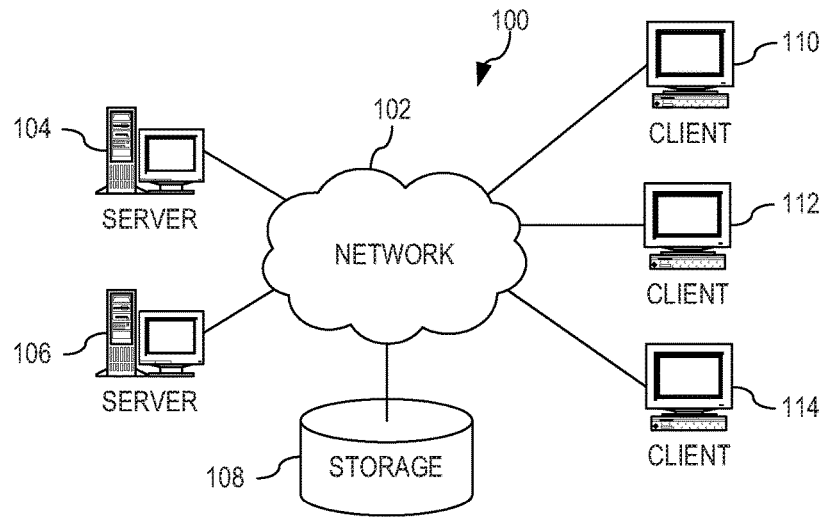
FIG. 1 is an example diagram of a distributed data processing system in which aspects of the illustrative embodiments may be implemented.

As discussed previously, a smart device is an electronic device, generally connected to other devices or networks via different wireless protocols such as Bluetooth, Near-field communication (NFC), Wi-Fi, 3G, 4G, 5G, etc., that can operate to some extent interactively and autonomously. Several notable types of smart devices are smartphones, smart thermostats, phablets and tablets, smartwatches, smart bands, smart key chains and smart speakers. With smart device screens getting bigger, users are encountering difficulties reaching portions of the screen using just one hand with ease. Think of a 6-inch screen and the day-to-day use of a smart device. In most cases, a user using his or her thumb on their hand to reach an application icon on the screen while holding the smart device in the same hand is extremely difficult. Thus, in order to access application icons on the screen that are furthest away from the user's thumb normally requires the use of two hands. To overcome this problem currently there are solutions like screen resizing or splitting the screen in more parts, but these solutions are 'static' solutions that, for example, don't take into account a user's movements or time or patterns.

Thus, the illustrative embodiments provide a smart device screen management mechanism for smart and effective single-hand wide-screen management of such electronic devices. Based on the assumption that the smart device screen is capacitive as in the most recent types of smart devices, when a user's thumb is approaching the screen, the smart device checks a variation of dielectric capacity. Taking advantage of this capability, the smart device screen management mechanism identifies the area covered by the user's thumb and may inscribe the area in a polygon, circle, or other pattern. As the user moves their thumb, the smart device screen management mechanism identifies the direction of thumb movement and predicts what action items are in the path of the direction. By using this information and having the information about the action items available on the screen, the smart device screen management mechanism generates a secondary user interface of the action items are in the path of the direction that cannot be physically reached by the user using only one hand. The smart device screen management mechanism also utilizes machine learning to learn from the application icon selections made by the user to improve the action items that are predicted and presented within the secondary user interface.

Therefore, in this manner, the functionality or capability of computing systems is improved by providing smart and effective single-hand wide-screen management of such electronic devices. Additionally, the functionality or capability of computing systems is improved by providing the user with a better and more efficient way of utilizing their smart device using only one hand. By increasing the functionality of the smart device so that the user may use only one hand, the computing resources of the smart device are more efficiently utilized.

Furthermore, the present invention improves the technology or technical field involving software development. As discussed above, as screen sizes of smart device increase, the single-handed functionality of the smart device decreases. By providing a smart device screen management mechanism within a smart device that allows a user to single handedly operate the smart device then there is an improvement to the technology or technical field involving software development.

The technical solution provided by the present invention cannot be performed in the human mind or by a human using a pen and paper. That is, the technical solution provided by the present invention could not be accomplished in the human mind or by a human using a pen and paper in any reasonable amount of time and with any reasonable expectation of accuracy without the use of a computer.

Before beginning the discussion of the various aspects of the illustrative embodiments, it should first be appreciated that throughout this description the term "mechanism" will be used to refer to elements of the present invention that perform various operations, functions, and the like. A "mechanism," as the term is used herein, may be an implementation of the functions or aspects of the illustrative embodiments in the form of an apparatus, a procedure, or a computer program product. In the case of a procedure, the procedure is implemented by one or more devices, apparatus, computers, data processing systems, or the like. In the case of a computer program product, the logic represented by computer code or instructions embodied in or on the computer program product is executed by one or more hardware devices in order to implement the functionality or perform the operations associated with the specific "mechanism." Thus, the mechanisms described herein may be implemented as specialized hardware, software executing on general purpose hardware, software instructions stored on a medium such that the instructions are readily executable by specialized or general purpose hardware, a procedure or method for executing the functions, or a combination of any of the above.

The present description and claims may make use of the terms "a", "at least one of", and "one or more of" with regard to particular features and elements of the illustrative embodiments. It should be appreciated that these terms and phrases are intended to state that there is at least one of the particular feature or element present in the particular illustrative embodiment, but that more than one can also be present. That is, these terms/phrases are not intended to limit the description or claims to a single feature/element being present or require that a plurality of such features/elements be present. To the contrary, these terms/phrases only require at least a single feature/element with the possibility of a plurality of such features/elements being within the scope of the description and claims.

Moreover, it should be appreciated that the use of the term "engine," if used herein with regard to describing embodiments and features of the invention, is not intended to be limiting of any particular implementation for accomplishing and/or performing the actions, steps, processes, etc., attributable to and/or performed by the engine. An engine may be, but is not limited to, software, hardware and/or firmware or any combination thereof that performs the specified functions including, but not limited to, any use of a general and/or specialized processor in combination with appropriate software loaded or stored in a machine readable memory and executed by the processor. Further, any name associated with a particular engine is, unless otherwise specified, for purposes of convenience of reference and not intended to be limiting to a specific implementation. Additionally, any functionality attributed to an engine may be equally performed by multiple engines, incorporated into and/or combined with the functionality of another engine of the same or different type, or distributed across one or more engines of various configurations.

In addition, it should be appreciated that the following description uses a plurality of various examples for various elements of the illustrative embodiments to further illustrate example implementations of the illustrative embodiments and to aid in the understanding of the mechanisms of the illustrative embodiments. These examples intended to be non-limiting and are not exhaustive of the various possibilities for implementing the mechanisms of the illustrative embodiments. It will be apparent to those of ordinary skill in the art in view of the present description that there are many other alternative implementations for these various elements that may be utilized in addition to, or in replacement of, the examples provided herein without departing from the spirit and scope of the present invention.

Figure 2:
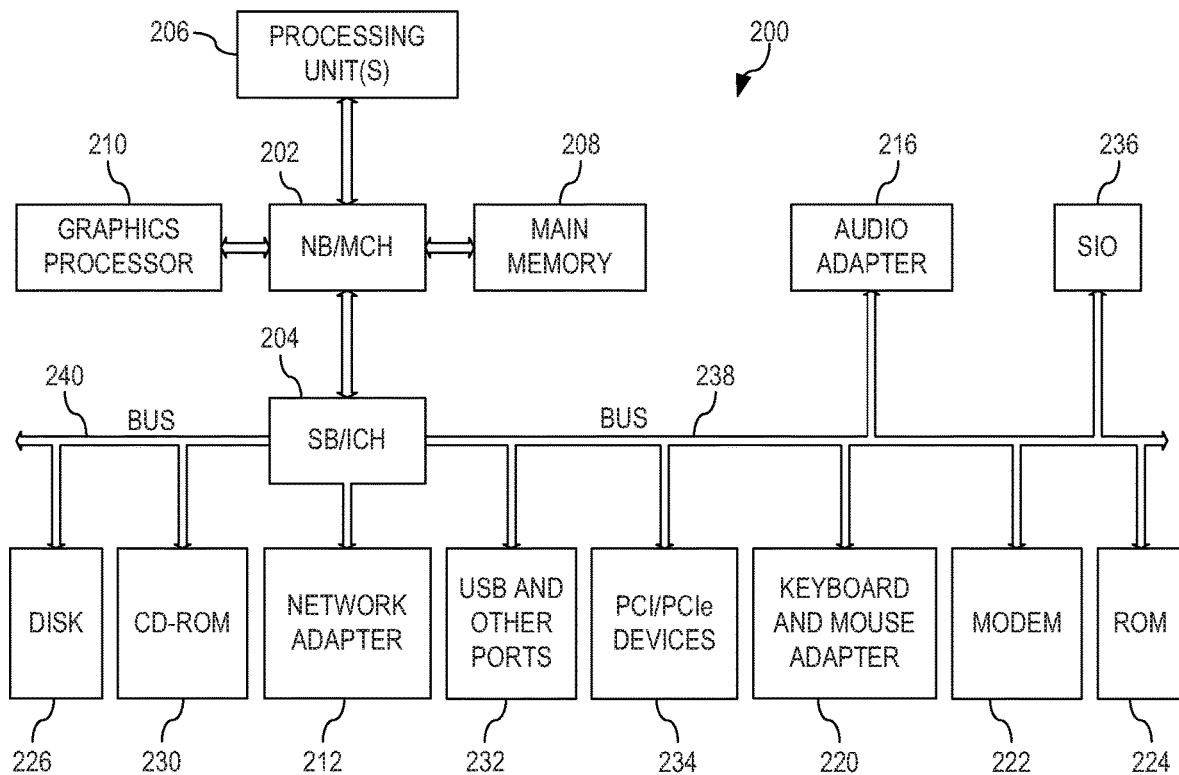
FIG. 2 is an example block diagram of a computing device in which aspects of the illustrative embodiments may be implemented.

Thus, the illustrative embodiments may be utilized in many different types of data processing environments. In order to provide a context for the description of the specific elements and functionality of the illustrative embodiments, FIGS. 1 and 2 are provided hereafter as example environments in which aspects of the illustrative embodiments may be implemented. It should be appreciated that FIGS. 1 and 2 are only examples and are not intended to assert or imply any limitation with regard to the environments in which aspects or embodiments of the present invention may be implemented. Many modifications to the depicted environments may be made without departing from the spirit and scope of the present invention.

FIG. 1 depicts a pictorial representation of an example distributed data processing system in which aspects of the illustrative embodiments may be implemented. Distributed data processing system 100 may include a network of computers in which aspects of the illustrative embodiments may be implemented. The distributed data processing system 100 contains at least one network 102, which is the medium used to provide communication links between various devices and computers connected together within distributed data processing system 100. The network 102 may include connections, such as wire, wireless communication links, or fiber optic cables.

In the depicted example, server 104 and server 106 are connected to network 102 along with storage unit 108. In addition, clients 110, 112, and 114 are also connected to network 102. These clients 110, 112, and 114 may be, for example, personal computers, network computers, or the like. In the depicted example, server 104 provides data, such as boot files, operating system images, and applications to the clients 110, 112, and 114. Clients 110, 112, and 114 are clients to server 104 in the depicted example. Distributed data processing system 100 may include additional servers, clients, and other devices not shown.

In the depicted example, distributed data processing system 100 is the Internet with network 102 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers, consisting of thousands of commercial, governmental, educational and other computer systems that route data and messages. Of course, the distributed data processing system 100 may also be implemented to include a number of different types of networks, such as for example, an intranet, a local area network (LAN), a wide area network (WAN), or the like. As stated above, FIG. 1 is intended as an example, not as an architectural limitation for different embodiments of the present invention, and therefore, the particular elements shown in FIG. 1 should not be considered limiting with regard to the environments in which the illustrative embodiments of the present invention may be implemented.

As shown in FIG. 1, one or more of the computing devices, e.g., server 104, may be specifically configured to implement a smart device screen management mechanism. The configuring of the computing device may comprise the providing of application specific hardware, firmware, or the like to facilitate the performance of the operations and generation of the outputs described herein with regard to the illustrative embodiments. The configuring of the computing device may also, or alternatively, comprise the providing of software applications stored in one or more storage devices and loaded into memory of a computing device, such as server 104, for causing one or more hardware processors of the computing device to execute the software applications that configure the processors to perform the operations and generate the outputs described herein with regard to the illustrative embodiments. Moreover, any combination of application specific hardware, firmware, software applications executed on hardware, or the like, may be used without departing from the spirit and scope of the illustrative embodiments.

It should be appreciated that once the computing device is configured in one of these ways, the computing device becomes a specialized computing device specifically configured to implement the mechanisms of the illustrative embodiments and is not a general purpose computing device. Moreover, as described hereafter, the implementation of the mechanisms of the illustrative embodiments improves the functionality of the computing device and provides a useful and concrete result that facilitates smart and effective single-hand wide-screen management of smart devices.

As noted above, the mechanisms of the illustrative embodiments utilize specifically configured computing devices, or data processing systems, to perform the operations for smart and effective single-hand wide-screen management of smart devices. These computing devices, or data processing systems, may comprise various hardware elements which are specifically configured, either through hardware configuration, software configuration, or a combination of hardware and software configuration, to implement one or more of the systems/subsystems described herein. FIG. 2 is a block diagram of just one example data processing system in which aspects of the illustrative embodiments may be implemented. Data processing system 200 is an example of a computer, such as server 104 in FIG. 1, in which computer usable code or instructions implementing the processes and aspects of the illustrative embodiments of the present invention may be located and/or executed so as to achieve the operation, output, and external effects of the illustrative embodiments as described herein.

In the depicted example, data processing system 200 employs a hub architecture including north bridge and memory controller hub (NB/MCH) 202 and south bridge and input/output (I/O) controller hub (SB/ICH) 204. Processing unit 206, main memory 208, and graphics processor 210 are connected to NB/MCH 202. Graphics processor 210 may be connected to NB/MCH 202 through an accelerated graphics port (AGP).

In the depicted example, local area network (LAN) adapter 212 connects to SB/ICH 204. Audio adapter 216, keyboard and mouse adapter 220, modem 222, read only memory (ROM) 224, hard disk drive (HDD) 226, CD-ROM drive 230, universal serial bus (USB) ports and other communication ports 232, and PCI/PCIe devices 234 connect to SB/ICH 204 through bus 238 and bus 240. PCI/PCIe devices may include, for example, Ethernet adapters, add-in cards, and PC cards for notebook computers. PCI uses a card bus controller, while PCIe does not. ROM 224 may be, for example, a flash basic input/output system (BIOS).

HDD 226 and CD-ROM drive 230 connect to SB/ICH 204 through bus 240. HDD 226 and CD-ROM drive 230 may use, for example, an integrated drive electronics (IDE) or serial advanced technology attachment (SATA) interface. Super I/O (SIO) device 236 may be connected to SB/ICH 204.

An operating system runs on processing unit 206. The operating system coordinates and provides control of various components within the data processing system 200 in FIG. 2. As a client, the operating system may be a commercially available operating system such as Microsoft® Windows 7®. An object-oriented programming system, such as the Java™ programming system, may run in conjunction with the operating system and provides calls to the operating system from Java™ programs or applications executing on data processing system 200.

As a server, data processing system 200 may be, for example, an IBM eServer™ System p® computer system, Power™ processor based computer system, or the like, running the Advanced Interactive Executive (AIX®) operating system or the LINUX® operating system. Data processing system 200 may be a symmetric multiprocessor (SMP) system including a plurality of processors in processing unit 206. Alternatively, a single processor system may be employed.

Instructions for the operating system, the object-oriented programming system, and applications or programs are located on storage devices, such as HDD 226, and may be loaded into main memory 208 for execution by processing unit 206. The processes for illustrative embodiments of the present invention may be performed by processing unit 206 using computer usable program code, which may be located in a memory such as, for example, main memory 208, ROM 224, or in one or more peripheral devices 226 and 230, for example.

A bus system, such as bus 238 or bus 240 as shown in FIG. 2, may be comprised of one or more buses. Of course, the bus system may be implemented using any type of communication fabric or architecture that provides for a transfer of data between different components or devices attached to the fabric or architecture. A communication unit, such as modem 222 or network adapter 212 of FIG. 2, may include one or more devices used to transmit and receive data. A memory may be, for example, main memory 208, ROM 224, or a cache such as found in NB/MCH 202 in FIG. 2.

As mentioned above, in some illustrative embodiments the mechanisms of the illustrative embodiments may be implemented as application specific hardware, firmware, or the like, application software stored in a storage device, such as HDD 226 and loaded into memory, such as main memory 208, for executed by one or more hardware processors, such as processing unit 206, or the like. As such, the computing device shown in FIG. 2 becomes specifically configured to implement the mechanisms of the illustrative embodiments and specifically configured to perform the operations and generate the outputs described hereafter with regard to the smart device screen management mechanism that provides smart and effective single-hand wide-screen management of smart devices.

Those of ordinary skill in the art will appreciate that the hardware in FIGS. 1 and 2 may vary depending on the implementation. Other internal hardware or peripheral devices, such as flash memory, equivalent non-volatile memory, or optical disk drives and the like, may be used in addition to or in place of the hardware depicted in FIGS. 1 and 2. Also, the processes of the illustrative embodiments may be applied to a multiprocessor data processing system, other than the SMP system mentioned previously, without departing from the spirit and scope of the present invention.

Moreover, the data processing system 200 may take the form of any of a number of different data processing systems including client computing devices, server computing devices, a tablet computer, laptop computer, telephone or other communication device, a personal digital assistant (PDA), or the like. In some illustrative examples, data processing system 200 may be a portable computing device that is configured with flash memory to provide non-volatile memory for storing operating system files and/or user-generated data, for example. Essentially, data processing system 200 may be any known or later developed data processing system without architectural limitation.

Figure 3:
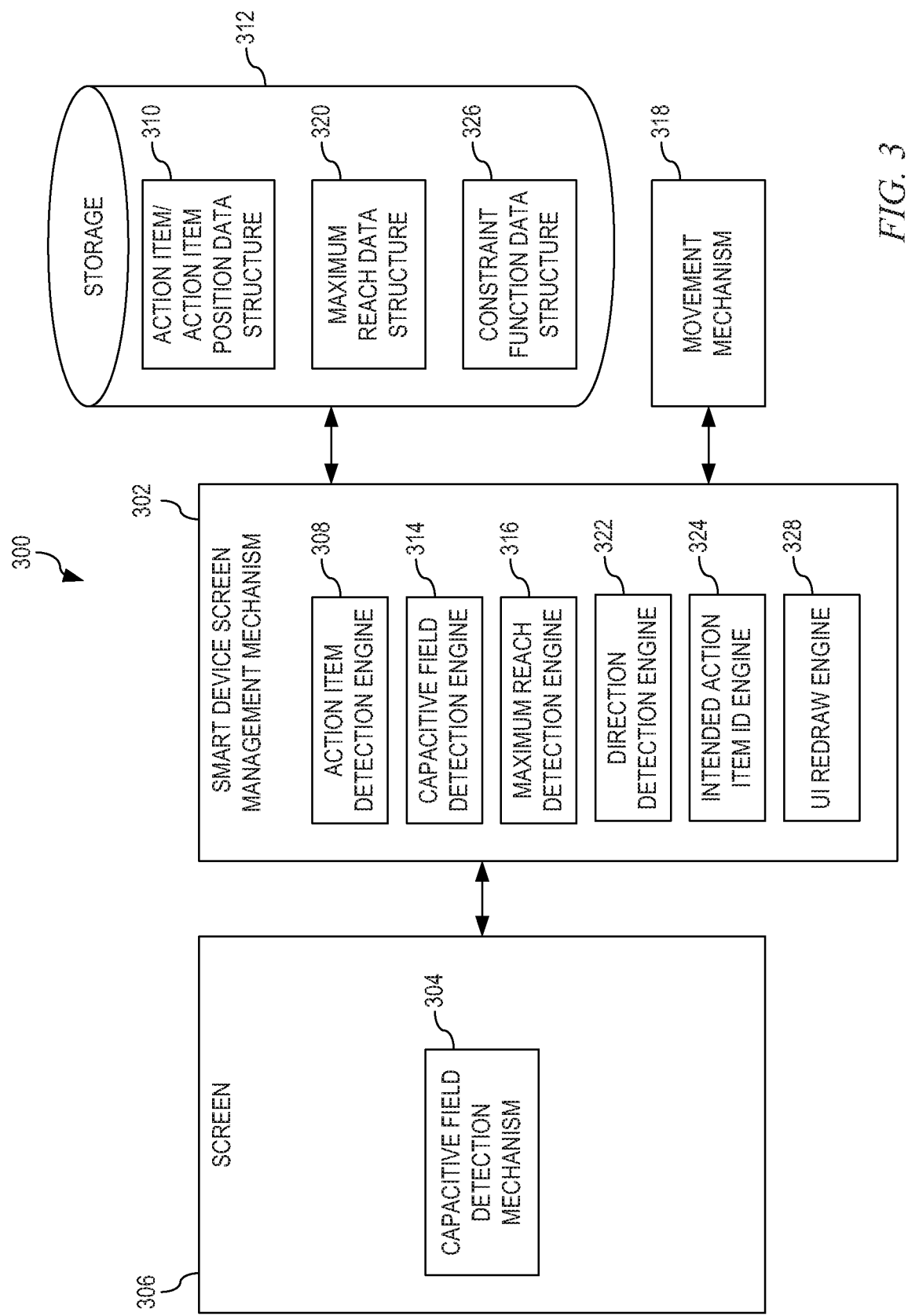
FIG. 3 depicts an exemplary functional block diagram of smart device screen management mechanism for smart and effective single-hand wide-screen management of a smart device in accordance with an illustrative embodiment.

FIG. 3 depicts an exemplary functional block diagram of smart device screen management mechanism for smart and effective single-hand wide-screen management of a smart device in accordance with an illustrative embodiment. Data processing system 300 comprises smart device screen management mechanism 302 that interacts with capacitive field detection mechanism 304 of a screen 306 of data processing system 300. Smart device screen management mechanism 302 further comprises action item detection engine 308, capacitive field detection engine 314, maximum reach detection engine 316, direction detection engine 322, intended action item identification (ID) engine 324, and user interface (UI) redraw engine 328.

Figure 4:
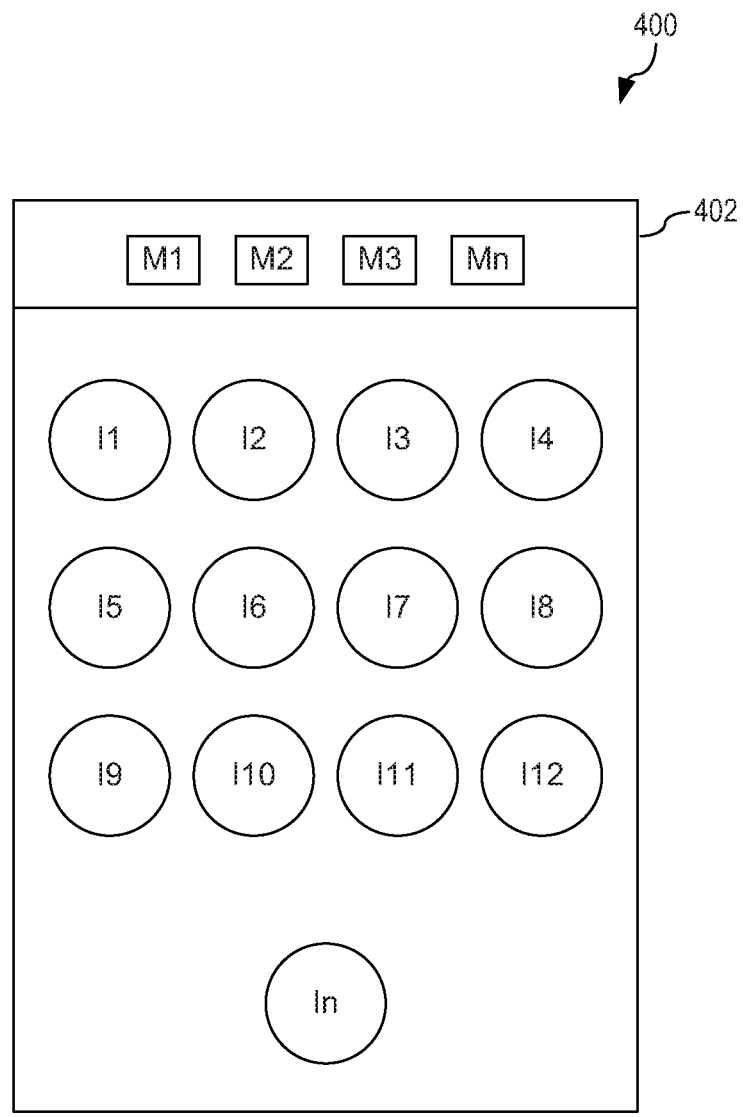
FIG. 4 depicts one example of a screen of a data processing system on which application icons and menus are detected by action item detection engine in accordance with an illustrative embodiment.

In operation, action item detection engine 308 detects all action items that appear on a screen 306 of data processing system 300. In accordance with the illustrative embodiments, an action item is extended to all the functionalities that a user interface of data processing system 300 presents to the user on a current screen 306, such as, for example, application icons, menus, or the like. FIG. 4 depicts one example of screen 402, which is a screen such as screen 306 of FIG. 3, of data processing system 400 on which application icons I1-In and menus M1-Mn are detected by action item detection engine 308 of FIG. 3 in accordance with an illustrative embodiment. In the example, I represents an icon and M represents a menu; however, both I and M are merely notations in accordance with the example. Action item detection engine 308 detects action items on screen 306 as well as a position of each action item on screen 306, which are then stored in action item/action item position data structure 310 of storage 312.

Figure 5:
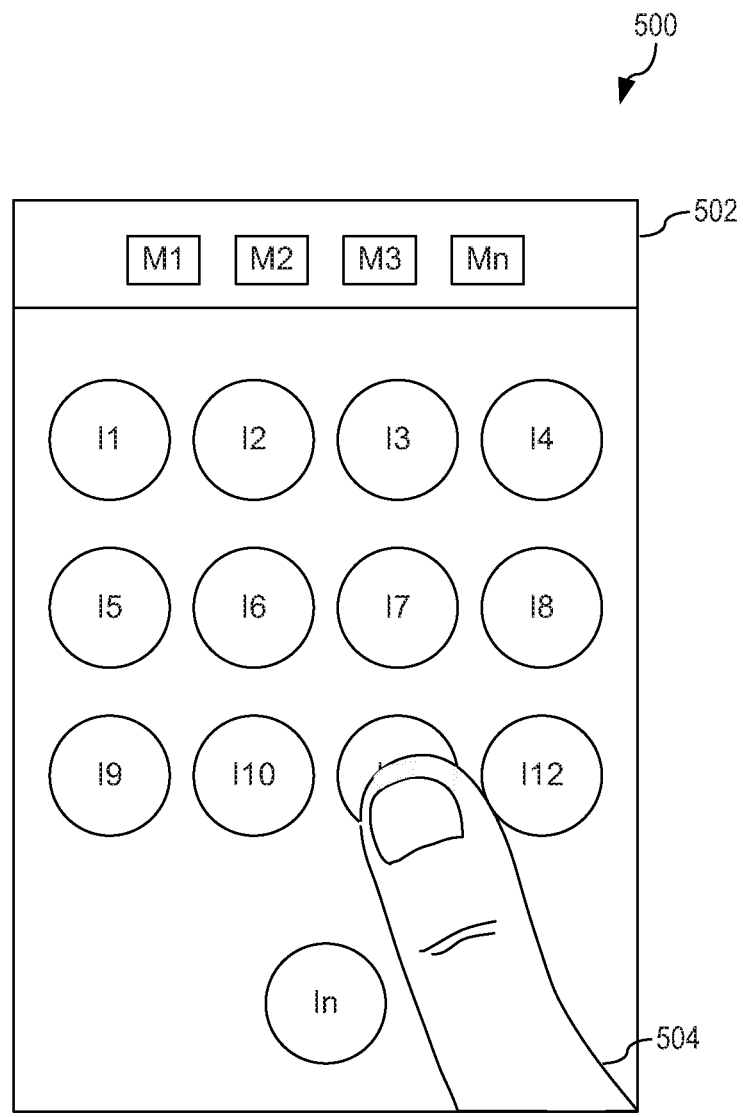
FIG. 5 depicts one example of a tip of a user's thumb coming into contact with an icon on a screen in accordance with an illustrative embodiment.

Once all action items and their associated positions are identified, capacitive field detection engine 314 monitors capacitive field detection mechanism 304 for an identification of a location on screen 306 where the capacity field indicates that a user has come close to contacting or has actually contacted screen 306. Capacitive field detection mechanism 304 identifies the detection by noticing the variation of the capacitive field on screen 306. FIG. 5 depicts one example of a tip of a user's thumb 504 coming into contact with icon I11 on screen 502 in accordance with an illustrative embodiment. While the illustrative embodiments utilize a user's thumb, this is only one example of the user may use to operate screen 502 or 306. That is, the user may also use a finger, toe, stylus, capacitive pen, or the like. FIG. 5 illustrates a single-handed usage of data processing 500 where the user is right handed, but the illustrative embodiments operates for left-handed user's as well. Once capacitive field detection mechanism 304 identifies the location of the user's thumb on screen 306, capacitive field detection engine 314 identifies the location and coordinates the location with a proximity of an action item in action item/action item position data structure 310. However, until the user releases their contact with screen 306, i.e. lifts up their thumb, capacitive field detection mechanism 304 and thus, capacitive field detection engine 314, continue to monitor the user's thumb movement for a final action item selection.

Figure 6:
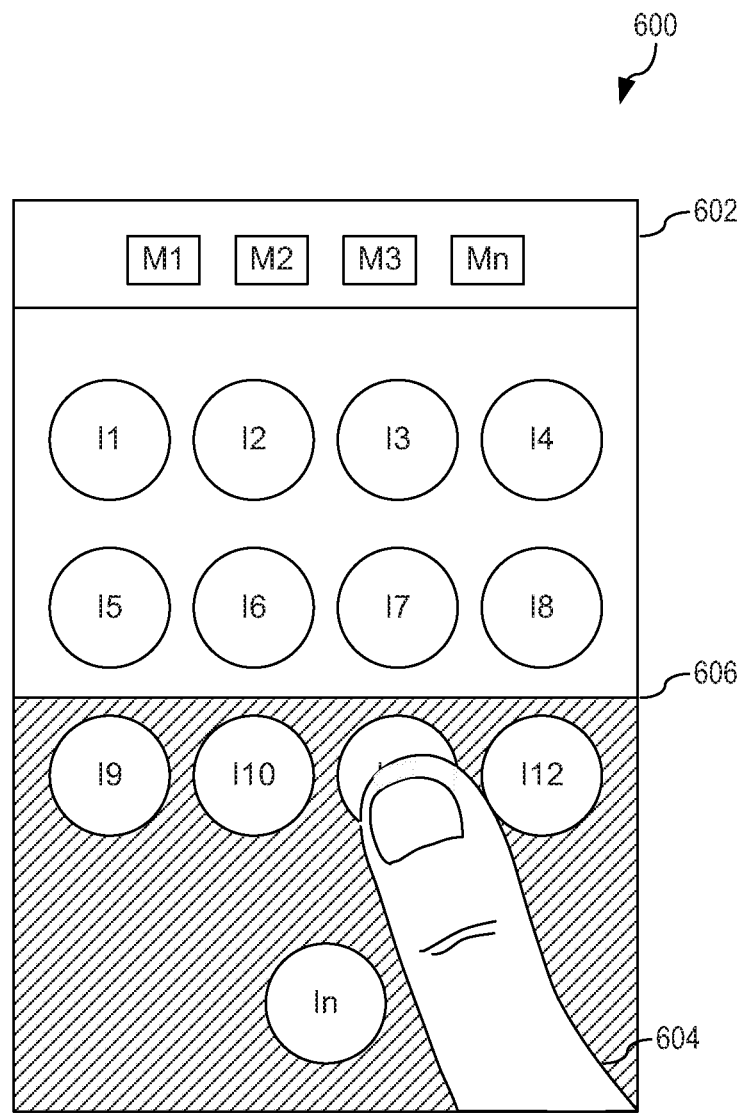
FIG. 6 depicts one example of a maximum reach of a user's thumb coming into contact with an icon on a screen of a data processing system in accordance with an illustrative embodiment.

As the user's thumb moves on screen 306, maximum reach detection engine 316 utilizes information identified from capacitive field detection engine 314 as well as movement mechanism 318 to learn a maximum thumb reach of the user. That is, where capacitive field detection engine 314 monitors the user' thumb movement via capacitive field detection mechanism 304, movement mechanism 318 detects an adjustment of the user's hand to reach one or more action items that are not within the normal reach of the user's thumb unless the user's hand is adjusted. Thus, in a learning phase, maximum reach detection engine 316 identifies a maximum thumb reach of the user and stores the maximum reach information in maximum reach data structure 320 of storage 312. FIG. 6 depicts one example of a maximum reach of a user's thumb 604 coming into contact with icon I11 on screen 602 of data processing system 600 in accordance with an illustrative embodiment. As is shown, without the user repositioning data processing system 600 in their hand, the maximum reach of the user's thumb 604 on screen 602 is shown by maximum reach hashed area 606.

Figure 7:
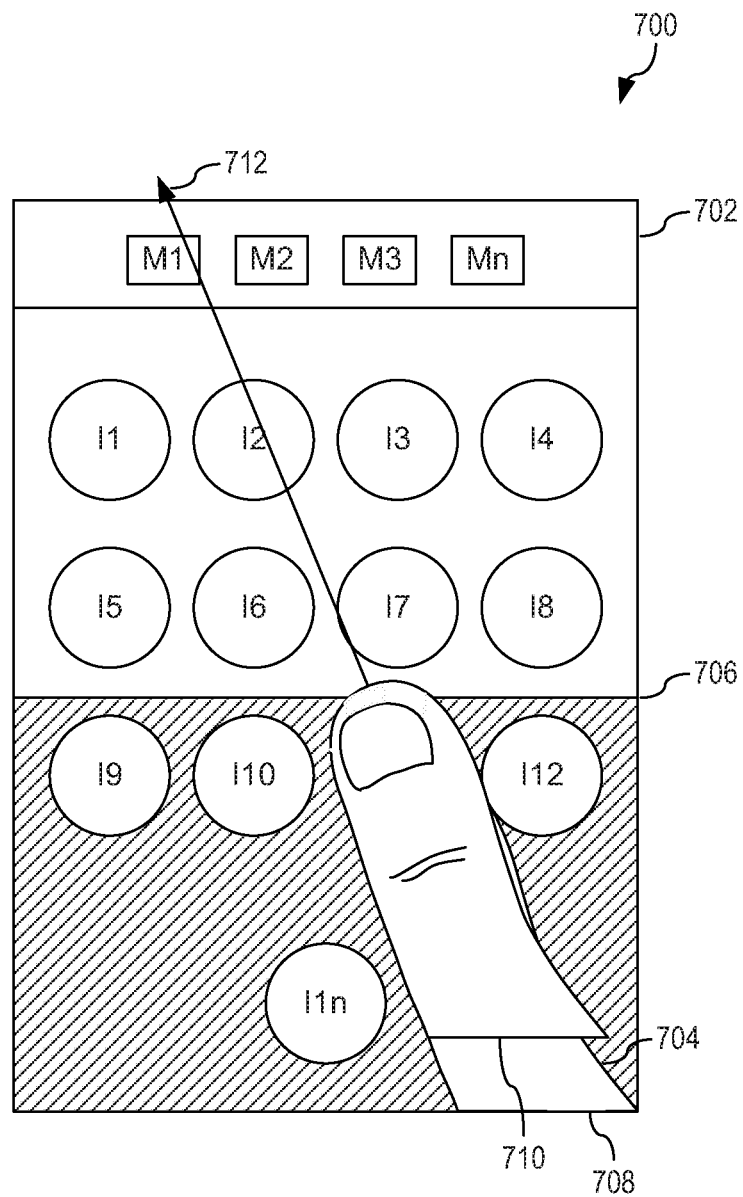
FIG. 7 depicts one example of determining a direction of a user's thumb movement on a screen of a data processing system in accordance with an illustrative embodiment.

Utilizing the maximum reach information detected by maximum reach detection engine 316 and the user's thumb movement identified by capacitive field detection engine 314 via capacitive field detection mechanism 304, direction detection engine 322 identifies a direction of the user's thumb movement on screen 306. FIG. 7 depicts one example of determining a direction of the user's thumb 704 movement on screen 702 of data processing system 700 in accordance with an illustrative embodiment. In this example, capacitive field detection engine 314 identifies a movement of the user's thumb 704 from position 708 to position 710 up to maximum reach hashed area 706. However, if the user's thumb 704 is not touching and then releasing on a specific action item I9-In within maximum reach hashed area 706 for a predefined time, direction detection engine 322 uses the movement of the user's thumb 704 from position 708 to position 710 to identify direction 712.

With direction 712 identified, intended action item identification (ID) engine 324 performs a system check of every constraint functions stored in constraint function data structure 326. The constraint functions, f(x, y . . . , z), in constraint function data structure 326 may be based on many factor x, y . . . , z that may be simple as, for example, time constraint functions, or a more complex constraint functions that may represent, for example, a movement pattern matching, or a combination of both simple and complex constraint functions. Intended action item ID engine 324 performs constraint function result matching. For example, if intended action item ID engine 324 identifies that the users thumb 704 is not touching any of action items I9-Inmaximum reach hashed area 706 for a predefined time T (factor x) and also there is a position pattern matching(complex factor y=f(x, px1,px2,py1,py2)) for example that is a 'move forward' gesture, intended action item ID engine 324 infers that the user is trying to reach an action item outside the maximum reach hashed area 706 along direction 712, i.e. action items I7, I2, or M1.

Figure 8:
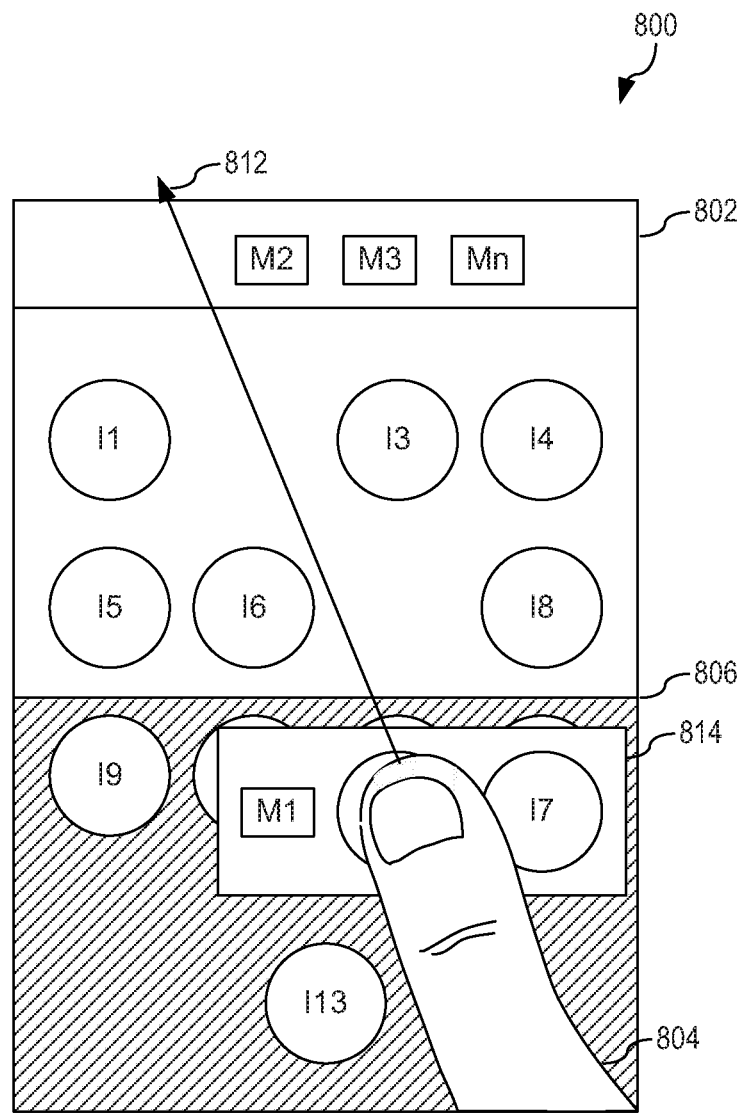
FIG. 8 depicts one example of redrawing the user interface on a screen of data processing system in accordance with an illustrative embodiment.

With the one or more action items outside the maximum reach hashed area along the identified direction identified, i.e. action items I7, I2, or M1, user interface (UI) redraw engine 328 collects the one or more action items by tagging the one or more action items as selectable. UI redraw engine 328 then redraws a more convenient UI, i.e. a secondary user interface, with an optimized view of the one or more action items at a position suited to be reachable by the user's thumb in an easier way. FIG. 8 depicts one example of redrawing the user interface on screen 802 of data processing system 800 in accordance with an illustrative embodiment. As is illustrated, UI redraw engine 328 redraws the one or more action items outside maximum reach hashed 806 area along the identified direction 812, i.e. action items I7, I2, or M1, into optimized view 814 so that the user may more easily select one of the one or more action items outside the maximum reach hashed area along the identified direction in optimized view 814.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), astatic random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

Figure 9:
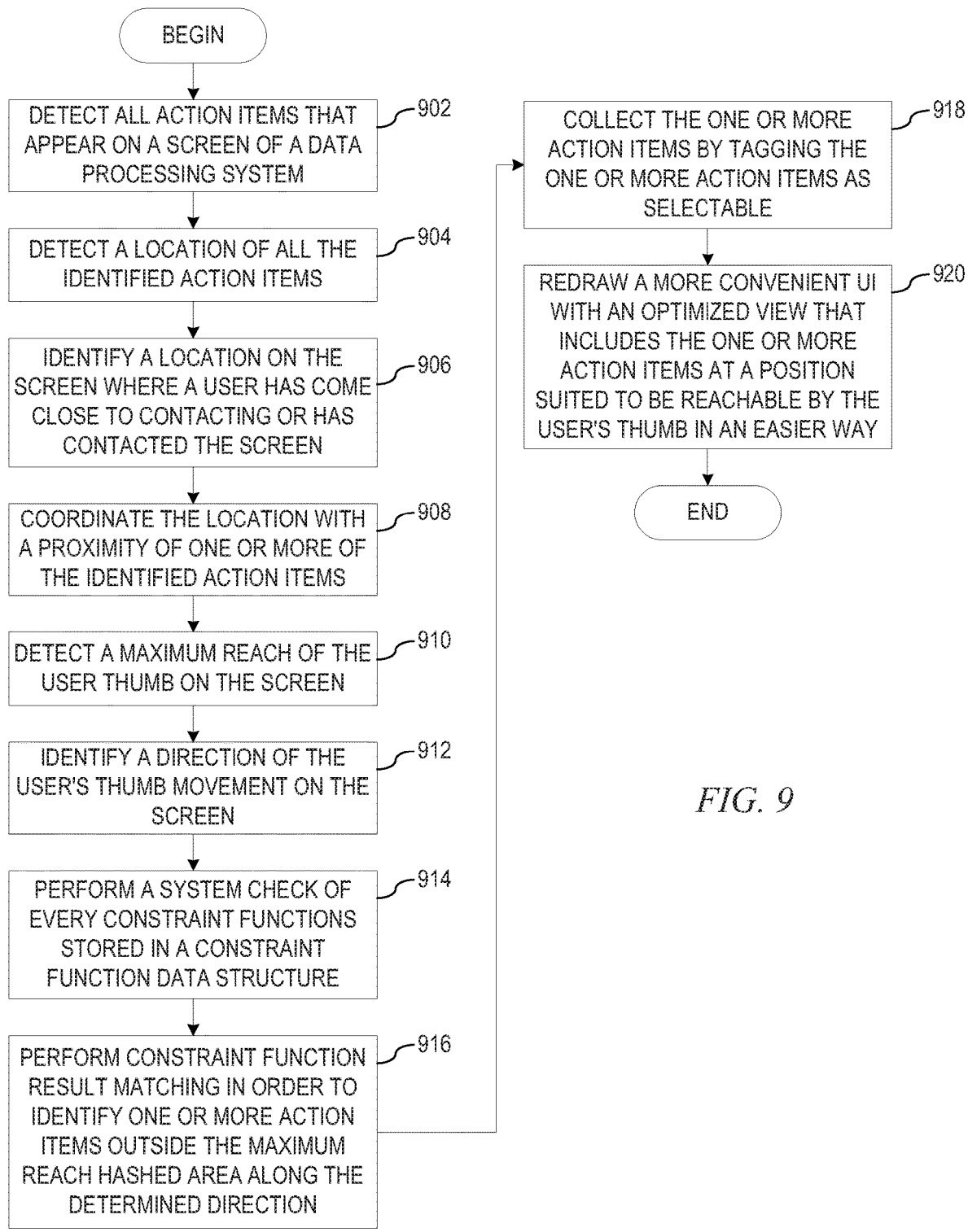
FIG. 9 depicts an exemplary flow diagram of the operation performed by a smart device screen management mechanism in facilitating smart and effective single-hand wide-screen management of a smart device in accordance with an illustrative embodiment.

FIG. 9 depicts an exemplary flow diagram of the operation performed by a smart device screen management mechanism in facilitating smart and effective single-hand wide-screen management of a smart device in accordance with an illustrative embodiment. As the operation begins, an action item detection engine of the smart device screen management mechanism detects all action items that appear on a screen of a data processing system (step 902) as well as a position of each action item on the screen (step 904), which the action item detection engine records in an action item/action item position data structure of a storage. Once all action items and their associated positions on the screen are identified, a capacitive field detection engine of the smart device screen management mechanism monitors a capacitive field detection mechanism for an identification of a location on the screen where the capacity field indicates that a user has come close to contacting or has actually contacted the screen (step 906). Once the capacitive field detection mechanism identifies the location of the user's thumb on the screen, the capacitive field detection engine coordinates the location with a proximity of an action item in the action item/action item position data structure (step 908).

As the user's thumb moves on the screen, maximum reach detection engine of the smart device screen management mechanism utilizes information identified from the capacitive field detection engine as well as a movement mechanism to learn a maximum thumb reach of the user (step 910). Utilizing the maximum reach information detected by the maximum reach detection engine and the user's thumb movement identified by the capacitive field detection engine via the capacitive field detection mechanism, a direction detection engine of the smart device screen management mechanism identifies a direction of the user's thumb movement on the screen (step 912). Responsive to the user's thumb not touching and then releasing on a specific action item within the maximum reach hashed area for a predefined time, an intended action item identification (ID) engine of the smart device screen management mechanism performs a system check of every constraint functions stored in a constraint function data structure (step 914). The constraint functions, f(x, y . . . , z), in the constraint function data structure may be based on many factor x, y . . . , z that may be simple as, for example, time constraint functions, or a more complex constraint functions that may represent, for example, a movement pattern matching, or a combination of both simple and complex constraint functions.

The intended action item ID engine then performs constraint function result matching in order to identify one or more action items outside the maximum reach hashed area along the determined direction (step 916). With the one or more action items outside the maximum reach hashed area along the identified direction identified, a user interface (UI) redraw engine of the smart device screen management mechanism collects the one or more action items by tagging the one or more action items as selectable (step 918). The UI redraw engine then redraws a more convenient UI with an optimized view that includes the one or more action items at a position suited to be reachable by the user's thumb in an easier way (step 920). The operation ends thereafter.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Thus, the illustrative embodiments provide mechanisms for a smart device screen management mechanism for smart and effective single-hand wide-screen management of such electronic devices. Based on the assumption that the smart device screen is capacitive as in the most recent types of smart devices, when a user's thumb is approaching the screen, the smart device checks a variation of dielectric capacity. Taking advantage of this capability, the smart device screen management mechanism identifies the area covered by the user's thumb and inscribes the area in a polygon. As the user moves their thumb, the smart device screen management mechanism identifies the direction of thumb movement and predicts what action items are in the path of the direction. By using this information and having the information about the action items available on the screen, the smart device screen management mechanism generates a secondary user interface of the action items are in the path of the direction that cannot be physically reached by the user using only one hand. The smart device screen management mechanism also utilizes machine learning to learn from the application icon selections made by the user to improve the action items that are predicted and presented within the secondary user interface.

As noted above, it should be appreciated that the illustrative embodiments may take the form of an entirely hardware embodiment, an entirely software embodiment or an embodiment containing both hardware and software elements. In one example embodiment, the mechanisms of the illustrative embodiments are implemented in software or program code, which includes but is not limited to firmware, resident software, microcode, etc.

A data processing system suitable for storing and/or executing program code will include at least one processor coupled directly or indirectly to memory elements through a communication bus, such as a system bus, for example. The memory elements can include local memory employed during actual execution of the program code, bulk storage, and cache memories which provide temporary storage of at least some program code in order to reduce the number of times code must be retrieved from bulk storage during execution. The memory may be of various types including, but not limited to, ROM, PROM, EPROM, EEPROM, DRAM, SRAM, Flash memory, solid state memory, and the like.

Input/output or I/O devices (including but not limited to keyboards, displays, pointing devices, etc.) can be coupled to the system either directly or through intervening wired or wireless I/O interfaces and/or controllers, or the like. I/O devices may take many different forms other than conventional keyboards, displays, pointing devices, and the like, such as for example communication devices coupled through wired or wireless connections including, but not limited to, smart phones, tablet computers, touch screen devices, voice recognition devices, and the like. Any known or later developed I/O device is intended to be within the scope of the illustrative embodiments.

Network adapters may also be coupled to the system to enable the data processing system to become coupled to other data processing systems or remote printers or storage devices through intervening private or public networks. Modems, cable modems and Ethernet cards are just a few of the currently available types of network adapters for wired communications. Wireless communication based network adapters may also be utilized including, but not limited to, 802.11 a/b/g/n wireless communication adapters, Bluetooth wireless adapters, and the like. Any known or later developed network adapters are intended to be within the spirit and scope of the present invention.

The description of the present invention has been presented for purposes of illustration and description, and is not intended to be exhaustive or limited to the invention in the form disclosed. Many modifications and variations will be apparent to those of ordinary skill in the art without departing from the scope and spirit of the described embodiments. The embodiment was chosen and described in order to best explain the principles of the invention, the practical application, and to enable others of ordinary skill in the art to understand the invention for various embodiments with various modifications as are suited to the particular use contemplated. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method, in a smart device comprising at least one processor and at least one memory, the at least one memory comprising instructions that are executed by the at least one processor to cause the at least one processor to be configured to implement a smart device screen management mechanism for facilitating smart and effective single-hand wide-screen management of the smart device, the method comprising:

in a learning phase, learning, by a maximum reach detection engine, a maximum reach of the user when the user is operating the smart device with a single hand;

storing, by the maximum reach detection engine, maximum reach information representing the maximum reach of the user in a maximum reach data structure in a storage of the smart device;

identifying, by the smart device screen management mechanism, a movement of a touch of a user on a screen of the smart device;

determining, by the smart device screen management mechanism, whether the movement of the touch of the user on the screen of the smart device indicates that user has selected a first action item of a set of first action items within the maximum reach of the user when the user is operating the smart device with a single hand by identifying that the user is touching and releasing on the first action item within a predefined time period;

responsive to identifying that the movement of the touch of the user on the screen of the smart device indicates that the user has failed to select the first action item of the set of first action items within the maximum reach of the user by touching and releasing on the first action item within the predefined time period, identifying, by the smart device screen management mechanism, that the movement of the touch of the user on the screen of the smart device indicates a direction of movement from a first position on the screen of the smart device to the maximum reach of the user on the screen of the smart device based on the maximum reach information in the maximum reach data structure;

identifying, by the smart device screen management mechanism, a set of second action items that are along a projected line of motion in the direction of the movement from the first position to the maximum reach of the user, wherein the set of second action items comprise each first action item, in the set of first action items, that are intersected by the projected line of motion; and presenting, by the smart device screen management mechanism, the set of second action items in a redrawn user interface within the maximum reach suited to be reachable by the touch of the user on the screen of the smart device when the user is operating the smart device with the single hand.

2. The method of claim 1, wherein each second action item in the set of second action items are functionality presented to the user via a user interface of the smart device on the screen of the smart device.

3. The method of claim 1, wherein the movement of the touch of the user the screen of the smart device is selected from the group consisting of a movement of a user's thumb, a movement of a user's finger, a movement of a stylus held by the user, or a movement of a capacitive pen held by the user.

4. The method of claim 1, wherein identifying the set of second action items that are in the direction of the movement of the touch of the user on the screen of the smart device and outside the maximum reach of the user comprises:
  performing, by the smart device screen management mechanism, a system check of a set of constraint functions stored in a constraint function data structure; and
  performing, by the smart device screen management mechanism, constraint function result matching in order to identify the set of second action items that is in the direction of the movement of the touch of the user on the screen of the smart device and outside the maximum reach of the user.

5. The method of claim 1, wherein each second action item in the set of second action items are identified by the method comprising:
  detecting, by the smart device screen management mechanism, the set of second action items appearing on a screen of the smart device; and
  detecting, by the smart device screen management mechanism, a position of each second action item of the set of second action items.

6. The method of claim 1, wherein the set of second action items comprises a plurality of first action items, in the set of first action items, that are displayed at different distances along the projected line of motion on the screen of the smart device.

7. The method of claim 1, wherein display of the first action items, which are identified for inclusion in the set of second action items, in their original locations on the screen of the smart device is discontinued in response to identifying the set of second action times and presenting the set of second items in the redrawn user interface while other ones of the first action items, which were not identified for inclusion in the set of second action items, continue to be displayed at their original locations on the screen of the smart device.

8. A computer program product comprising a computer readable storage medium having a computer readable program stored therein, wherein the computer readable program, when executed on a data processing system, causes the data processing system to implement a smart device screen management mechanism for facilitating smart and effective single-hand wide-screen management of a smart device, and further causes the data processing system to:
  in a learning phase, learn, by a maximum reach detection engine, a maximum reach of the user when the user is operating the smart device with a single hand;
  store, by the maximum reach detection engine, maximum reach information representing the maximum reach of the user in a maximum reach data structure in a storage of the smart device;
  identify, by the smart device screen management mechanism, a movement of a touch of a user on a screen of the smart device;
  determine, by the smart device screen management mechanism, whether the movement of the touch of the user on the screen of the smart device indicates that user has selected a first action item of a set of first action items within the maximum reach of the user when the user is operating the smart device with a single hand by identifying that the user is touching and releasing on the first action item within a predefined time period;
  responsive to identifying that the movement of the touch of the user on the screen of the smart device indicates that the user has failed to select the first action item of the set of first action items within the maximum reach of the user by touching and releasing on the first action item within the predefined time period, identify, by the smart device screen management mechanism, that the movement of the touch of the user on the screen of the smart device indicates a direction of movement from a first position on the screen of the smart device to the maximum reach of the user on the screen of the smart device based on the maximum reach information in the maximum reach data structure;
  identify, by the smart device screen management mechanism, a set of second action items that are along a projected line of motion in the direction of the movement from the first position to the maximum reach of the user, wherein the set of second action items comprise each first action item, in the set of first action items, that are intersected by the projected line of motion; and
  present, by the smart device screen management mechanism, the set of second action items in a redrawn user interface within the maximum reach suited to be reachable by the user when the user is operating the smart device with the single hand.

9. The computer program product of claim 8, wherein each second action item in the set of second action items are functionality presented to the user via a user interface of the smart device on the screen of the smart device.

10. The computer program product of claim 8, wherein the movement of the touch of the user on the screen of the smart device is selected from the group consisting of a movement of a user's thumb, a movement of a user's finger, a movement of a stylus held by the user, or a movement of a capacitive pen held by the user.

11. The computer program product of claim 8, wherein the computer readable program to identify the set of second action items that are in the direction of the movement of the touch of the user on the screen of the smart device and outside the maximum reach of the user further causes the data processing system to:
  perform, by the smart device screen management mechanism, a system check of a set of constraint functions stored in a constraint function data structure; and
  perform, by the smart device screen management mechanism, constraint function result matching in order to identify the set of second action items that is in the direction of the movement of the touch of the user on the screen of the smart device and outside the maximum reach of the user.

12. The computer program product of claim 8, wherein the computer readable program identifies each second action item in the set of second action items by further causing the data processing system to:
  detect, by the smart device screen management mechanism, the set of second action items appearing on a screen of the smart device; and
  detect, by the smart device screen management mechanism, a position of each second action item of the set of second action items.

13. The computer program product of claim 8, wherein the set of second action items comprises a plurality of first action items, in the set of first action items, that are displayed at different distances along the projected line of motion on the screen of the smart device.

14. The computer program product of claim 8, wherein display of the first action items, which are identified for inclusion in the set of second action items, in their original locations on the screen of the smart device is discontinued in response to identifying the set of second action times and presenting the set of second items in the redrawn user interface while other ones of the first action items, which were not identified for inclusion in the set of second action items, continue to be displayed at their original locations on the screen of the smart device.

15. A data processing system comprising:
at least one processor; and
at least one memory coupled to the at least one processor, wherein the at least one memory comprises instructions which, when executed by the at least one processor, cause the at least one processor to implement a smart device screen management mechanism for facilitating smart and effective single-hand wide-screen management of a smart device, and further cause the at least one processor to:
in a learning phase, learn, by a maximum reach detection engine, a maximum reach of the user when the user is operating the smart device with a single hand;
store, by the maximum reach detection engine, maximum reach information representing the maximum reach of the user in a maximum reach data structure in a storage of the smart device;
identify, by the smart device screen management mechanism, a movement of a touch of a user on a screen of the smart device;
determine, by the smart device screen management mechanism, whether the movement of the touch of the user on the screen of the smart device indicates that user has selected a first action item of a set of first action items within the maximum reach of the user when the user is operating the smart device with a single hand by identifying that the user is touching and releasing on the first action item within a predefined time period;
responsive to identifying that the movement of the touch of the user on the screen of the smart device indicates that the user has faded to select the first action item of the set of first action items within the maximum reach of the user by touching and releasing on the first action item within the predefined time period, identify, by the smart device screen management mechanism, that the movement of the touch of the user on the screen of the smart device indicates a direction of movement from a first position on the screen of the smart device to the maximum reach of the user on the screen of the smart device based on the maximum reach information in the maximum reach data structure;

identify, by the smart device screen management mechanism, a set of second action items that are along a projected line of motion in the direction of the movement from the first position to the maximum reach of the user, wherein the set of second action items comprise each first action item, in the set of first action items, that are intersected by the projected line of motion; and
present, by the smart device screen management mechanism, the set of second action items in a redrawn user interface within the maximum reach suited to be reachable by the user when the user is operating the smart device with the single hand.

16. The data processing system of claim 15, wherein each second action item in the set of second action items are functionality presented to the user via a user interface of the smart device on the screen of the smart device.

17. The data processing system of claim 15, wherein the movement of the touch of the user on the screen of the smart device is selected from the group consisting of a movement of a user's thumb, a movement of a user's finger, a movement of a stylus held by the user, or a movement of a capacitive pen held by the user.

18. The data processing system of claim 15, wherein the instructions to identify the set of second action items that are in the direction of the movement of the touch of the user on the screen of the smart device and outside the maximum reach of the user further cause the at least one processor to:
perform, by the smart device screen management mechanism, a system check of a set of constraint functions stored in a constraint function data structure; and
perform, by the smart device screen management mechanism, constraint function result matching in order to identify the set of second action items that is in the direction of the movement of the touch of the user on the screen of the smart device and outside the maximum reach of the user.

19. The data processing system of claim 15, wherein the set of second action items comprises a plurality of first action items, in the set of first action items, that are displayed at different distances along the projected line of motion on the screen of the smart device.

20. The data processing system of claim 15, wherein display of the first action items, which are identified for inclusion in the set of second action items, in their original locations on the screen of the smart device is discontinued in response to identifying the set of second action times and presenting the set of second items in the redrawn user interface while other ones of the first action items, which were not identified for inclusion in the set of second action items, continue to be displayed at their original locations on the screen of the smart device.

* * * * *